Figures 1, 2, 3:
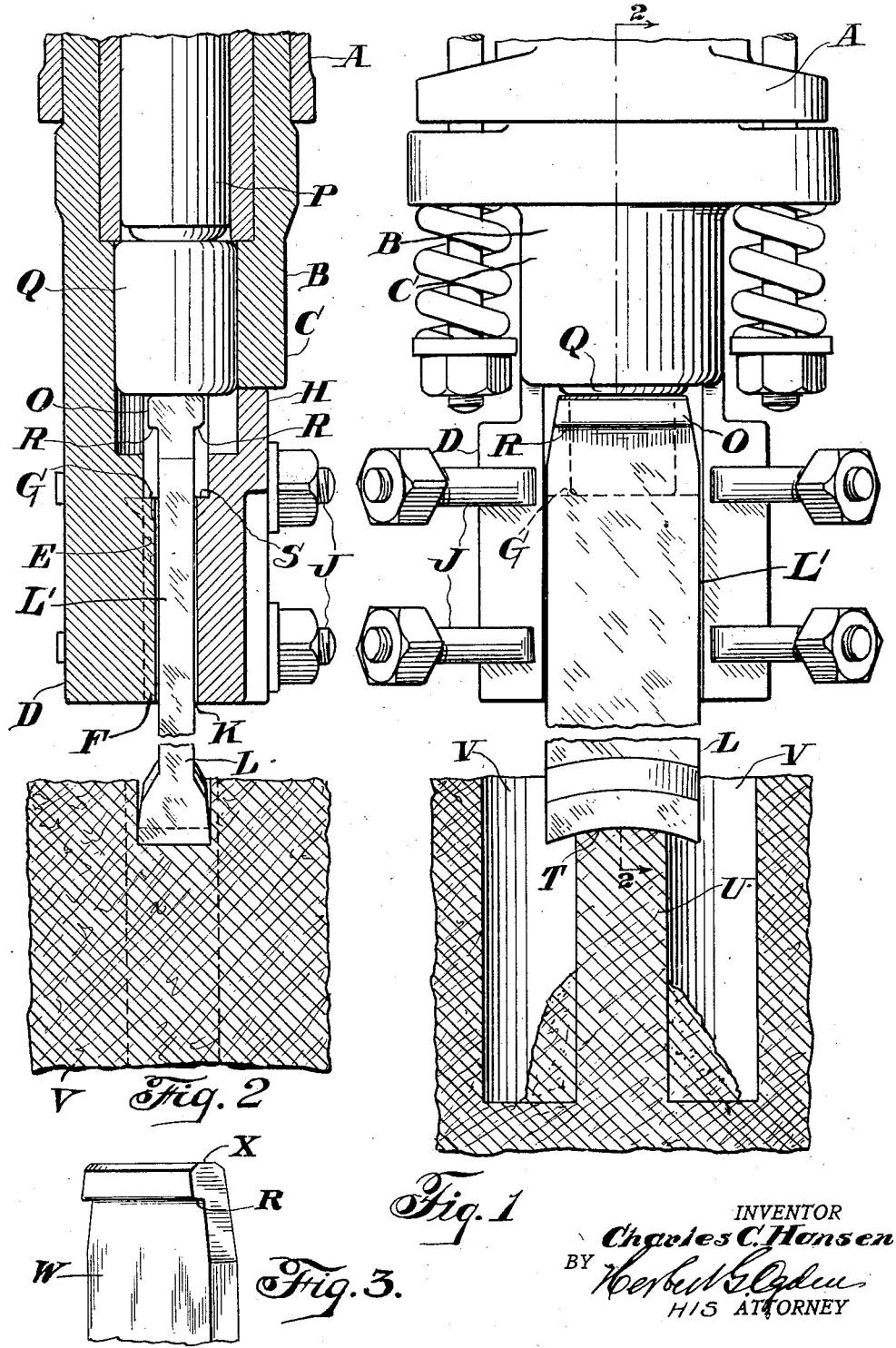

April 3, 1928. 1,664,623

C. C. HANSEN

BROACHING TOOL

Filed Jan. 8, 1926

INVENTOR
Charles C. Hansen
BY Herbert G. Ogden
HIS ATTORNEY

Patented Apr. 3, 1928.

1,664,623

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

BROACHING TOOL.

Application filed January 8, 1926. Serial No. 80,017.

This invention relates to broaching tools, but more particularly to that type of broaching tools adapted for severing blocks of rock from the mass.

Usually in such quarrying operations, it is a common practice to drill a series of holes in line. The adjacent holes are so spaced with respect to each other that a narrow wall of rock remains therebetween and the walls thus formed are afterwards cut away by means of a broaching tool.

One type of broaching tool commonly used for this purpose comprises a rectangular body portion having a cutting face at one end and either a round or hexagonal shank at the other end. Due to various causes, principally to the small cross sectional area of the shank which this form of construction permits, it has been found exceedngly difficult to prevent the departure of the cutting face of the broach from a desired course.

It is therefore an object of this invention to construct a broaching tool of uniform rigidity throughout its length.

Another object is to provide a large area of contact between the tool and its guide.

Other objects will be in part obvious and in part pointed out hereinafter.

The invention is shown in one of its preferred forms in the accompanying drawings, in which Figure 1 is an elevation of the broaching tool showing the manner in which it is guided by a front head of a rock drill, only a portion of the front end of the drill being shown for illustrative purposes, Figure 2 is an elevation in section taken through Figure 1 on the line 2—2 looking in the direction of the arrows, and Figure 3 is a perspective view of the shank end of a broaching tool showing a modification of the invention.

Referring to the drawings, the invention is shown applied to a rock drill, only the front end of the cylinder A being shown. Inserted in the front end of the cylinder A is a broaching attachment or front head B of the type which constitutes the subject matter of my copending application, Serial No. 68,262, filed November 11, 1925, for a broaching attachment for rock drills. The front head B is accordingly provided with a forwardly projecting cylindrical portion C which carries at its forward end an extension D provided on its inner face E with a flat cheek plate F. The cheek plate F is preferably somewhat shorter than the face E so that a shoulder G is formed at the inner end of said cheek plate.

Secured to one side of the extension D is a guide block H held in position in this instance by means of suitable eye-bolts J secured on opposite sides of the extension D. Since the front head B is described in detail in the aforesaid application, and since it forms no part of the present invention further description thereof is considered unnecessary, other than to point out that the cheek plate F and the guide block H form a guideway K for slidably guiding a working implement, or more specifically, a broaching tool.

In accordance with the practice of the invention, a broaching tool L having a body portion L' of substantially uniform rectangular cross sectional area of which the rearward portion forms a shank is provided at one end with a T-shaped head O. The head O is preferably also rectangular and may be, as shown, of somewhat smaller length than the width of the body portion of the broaching tool L. The head O in this instance serves as the impact end of the broaching tool for the reception of the blows delivered by a piston P, and which blows in this instance are transmitted to said head by an anvil block Q interposed between said piston and the broaching tool. The head O is preferably of sufficiently greater depth than the body portion of the broaching tool L so that shoulders R may be formed on the lower side of said head to cooperate with the shoulder G of the cheek plate F and a shoulder S formed on the guide block H for preventing ejection of the broaching tool L from the front head B by the hammer piston and to prevent removal of the tool from the front head when said tool is being withdrawn from the work.

Although the head O is illustrated in the drawings as having shoulders R on either side thereof, it is to be understood that I do not wish to limit myself to the showing in the drawings, since the invention may be modified in various other forms, such as for instance, a shoulder on only one side of the head O.

In the present instance the broaching tool L is flared at its other end and is provided with a smooth concave cutting face T substantially of the same width as the body portion of said tool. By thus forming the cutting face T in the manner described, said cutting face may extend well on opposite sides of a wall of rock U which separates adjacent drill holes V. In this manner a convex cut will be formed on the wall U so that the cuttings may readily drop to the bottom of the holes V and the broaching tool L may be more easily supported and held against displacement on the rock face.

By means of the present invention, a broaching tool may be formed which possesses substantially uniform strength throughout its length, thus eliminating the tendency of the broaching tool to creep or depart from the narrowest point of the wall U.

In the modification illustrated in Figure 3 a broaching tool W is shown in which a head X is provided with a shoulder R on only one side thereof. The shoulder R in this modification may, if desired, be made of somewhat greater depth than the shoulders R shown in the preferred modification in Figures 1 and 2 or may be of the same depth since the function of said shoulder is chiefly to prevent removal of the broaching tool from the attachment wherein it is held and guided during the withdrawal of the broaching tool from the work. With the exception of the head X the broaching tool W is in all other respects substantially like the broaching tool shown in the preferred modification. By forming only one shoulder on the tool W it is obvious that either of the shoulders G or S of the front head B or the guide block H may be eliminated if desired.

I claim:

1. A broaching tool comprising a flat rectangular body portion of substantially uniform cross sectional area throughout its length to prevent flexion thereof, a portion of said body portion comprising a shank adapted to cooperate slidably with a guiding attachment, a shoulder at one end of said portion forming a head adapted to receive the blows of a rock drill piston and a cutting bit at the other end of the body portion, said bit being of substantially the same width as the body portion.

2. A broaching tool comprising a flat rectangular body portion of substantially uniform cross sectional area throughout its length to prevent flexion thereof, opposed shoulders at one end of the body portion and only on two sides thereof to form a T-shaped head of rectangular cross section for engagement with a guiding attachment and against which head blows of impact may be delivered, and a cutting bit at the other end of and of the same width as the body portion.

In testimony whereof I have signed this specification.

CHARLES C. HANSEN.